Patented Jan. 3, 1950

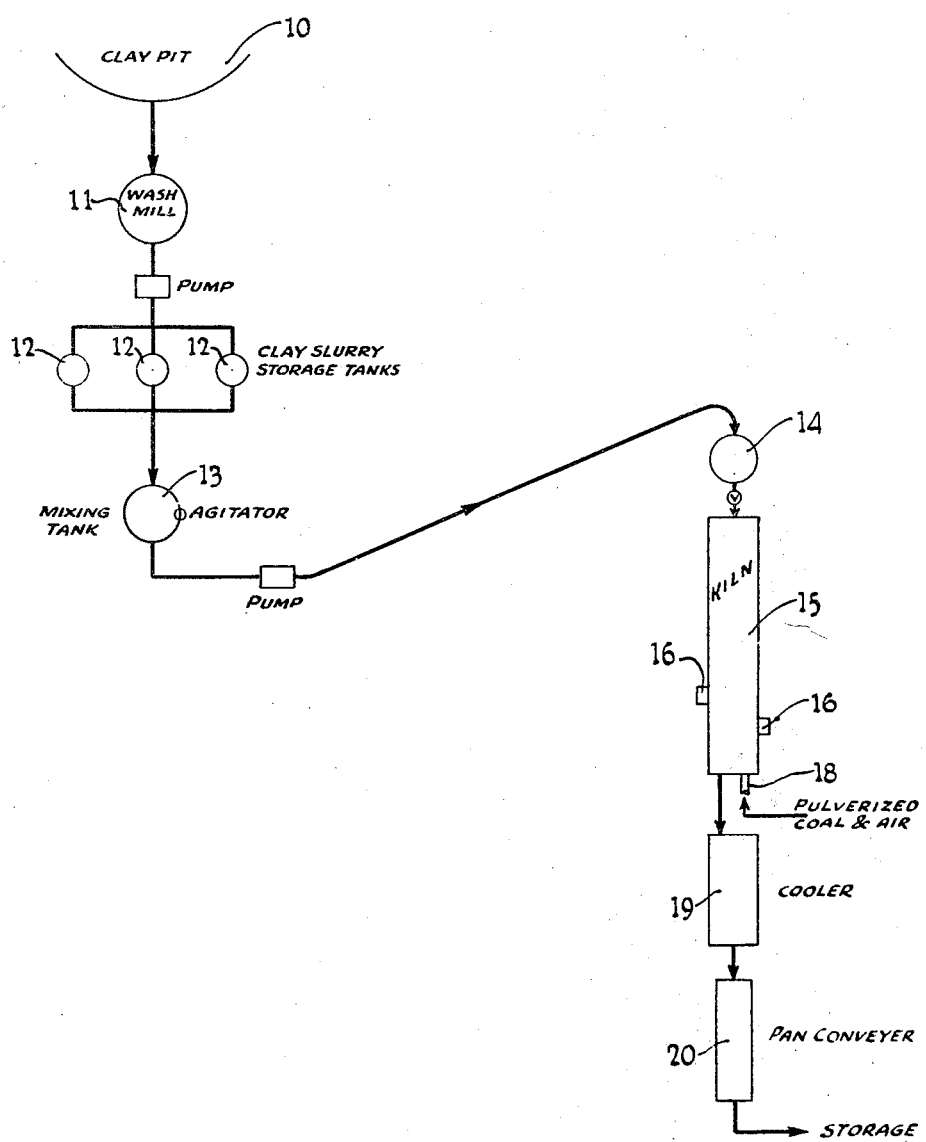

2,493,198

UNITED STATES PATENT OFFICE 2,493,198

PROCESS FOR PRODUCING LIGHTWEIGHT AGGREGATES

Frederick W. Kelley, Jr., Catskill, N. Y., assignor to North American Cement Corporation, Catskill, N. Y., a corporation of Delaware Application January 7, 1947, Serial No. 720,599

7 Claims. (Cl. 25—156)

This invention relates to the manufacture of light weight aggregates particularly suitable for the production of hydraulic cement concrete.

Several processes for the preparation of artificially expanded aggregates of this character have been suggested in the art, but they generally involve procedures and machinery making their manufacture uneconomical. These prior processes generally require the use of extensive equipment such as driers, grinders or extruding equipment.

An object of the invention is to provide a simple, economical process for producing light weight aggregates using equipment already available in wet process cement plants employing relatively long kilns. The process does not require the use of any special or extra equipment for drying the clay and does not require extruding equipment, both of which are expensive to operate. Another object is to provide a simple procedure for producing aggregates of varying loose densities without involving the use of extensive conveying and storage equipment.

These and other objects of the invention are most expeditiously accomplished by forming a slurry of clay in water, preferably together with a bloating agent, and treating the same by a carefully controlled procedure involving passing the clay material through a relatively long kiln provided with a means at an intermediate point for the introduction of a finely divided refractory material. During its passage through the kiln while being exposed to heat due to a flame at the exit end, the clay slurry gradually looses its moisture content, becomes coherent and forms granules of varying size which, through the rolling action in the kiln, become rounded out in the form of pellets. While these pellets are still in a slightly damp condition, a finely divided refractory coating material is introduced which serves among other functions to prevent the pellets from fusing together in the burning zone of the kiln. The coating materials employable are those having higher refractory properties than clay. Fine molding sand is preferred because it is more economical, but pulverized limestone or Portland cement may be employed instead.

As the pellets roll through the kiln they become covered with the coating material on their outer surface. When the pellets reach the burning zone, the clay on the outer surface of the pellets softens or fuses and forms an almost impermeable surface. Then as the heat progresses to the interior of the pellets, gases are formed and the pellets swell and become bloated. The pelleted material thereupon is cooled, preferably by passing it through a suitable rotary cooler, and it is then ready for use or shipment.

The gases causing the swelling or bloating may be obtained by any of several agencies or procedures. Since the pellets are moist at the time of heating, the gases from this moisture appear to cause a limited amount of swelling. A greater amount of swelling may be effected by selecting clay having therein those impurities known to cause swelling under the heat treatment of the character contemplated by the present invention.

When substantial swelling is desired for the production of an extremely light weight aggregate, a bloating agent is added to the clay before it is introduced into the kiln, examples of such agents being pulverized coal, sawdust (preferably dampened before using) trisodium phosphate, iron oxide, manganese dioxide, aluminum sulfate, sodium carbonate or the like. From 1 to 10% of such materials in the clay give practical results.

The process will be described more in detail in connection with the accompanying drawing wherein a diagrammatic flow sheet of the various steps and apparatus is set out. With reference to the drawing, clay as obtained from the pit 10 is made into a slurry with water in a conventional cement plant washing mill 11 wherein vigorous agitation is carried out until the clay is thoroughly distributed in the water. The amount of the water needed varies with the type of clay employed. Ordinarily a slurry containing 70% water is satisfactory.

From the wash mill 11, the slurried clay is pumped to any of several storage tanks 12 from which it is gravity fed to a mixing tank or agitator 13 into which the coal or other bloating agent is introduced in the desired amount in relation to the amount of incoming slurry. In this tank the mixture is made into a homogeneous mass by an electrically operated agitator or other suitable means. The slurry from this tank is then pumped to a feed tank 14 preferably located at the high charging end of the rotary kiln 15. This kiln suitably has a diameter of 8 feet and a length of 110 feet. The kiln may be satisfactorily heated by means of pulverized coal and air introduced through the inlet 18 into the lower or discharge end. Alternatively the kiln may be fired by oil or gas if so desired.

From this tank 14, the slurry is gravity fed through a valve controlled conduit into the kiln 15 at a rate determined by the rate of slurry introduction, and the pitch and speed of rotation of the kiln, the variables being correlated such that at a point about 30–34 feet from the discharge end of the kiln, pellets of the clay are formed, in slightly damp condition. This result can be obtained, for example, by a rotation rate of approximately 64 R. P. M. in a 110 foot kiln of an 8 foot diameter mounted at a pitch of five eighths of an inch per foot. At a place on the kiln near this point, suitably from 26 to 29 feet from the discharge end, the kiln is provided with chutes 16 equipped with hinged covers (not shown) so arranged that the covers automatically open when the chute is on the rising side of the kiln, thereby to admit a coating material, and automatically close on the falling side of the kiln. Fine molding sand or other refractory material is introduced into these chutes from a hopper or other means (not shown). As the damp pellets roll through the kiln, they pick up the sand on their outer surface. Then the heat of the hot flame dries the pellets, softens or fuses the outer surface of the clay, gasifies the coal and causes the pellets to swell. Because of the higher refractoriness of the sand and its resistance to the heat, the pellets do not fuse together. The coal-air mixture introduced at 18 into the kiln for providing the heat is regulated so as to bring about the required softening of the outer surface of the pellets and the desired bloating. These results can ordinarily be obtained at a temperature of about 2050° C. From the kiln 15 the hot bloated pellets flow to a cooler 19, thence to a pan conveyor 20 and finally to a truck, a railroad car or to storage.

The process is not limited to the specific apparatus above described, for kilns of other dimensions and auxiliary apparatus of other types may be employed. If desired, the bloating material may be added directly to the wash mill and the agitator 13 may be omitted. A ferris wheel feeder of the type normally used to feed kilns in wet process cement plants and driven by the rotation of the kiln may be used to feed the slurry into the kiln. An automatic pick-up scoop may be used for feeding the coating material into the kiln shell instead of the chutes.

The present process possesses the outstanding advantage of providing in one and the same equipment aggregates of varying loose densities of from 15–75 pounds per cubic foot. These different densities may be obtained through proper choice of bloating agent and regulation of the other conditions. The size gradation of the pellets may be varied by alteration of the ordinary factors, but very surprisingly they may be varied also by merely altering the percentage of moisture employed in making up the slurry. With lower percentages of moisture, larger pellets are produced. The following table illustrates the change in size gradation obtained merely by varying the amount of water in the slurry, all other conditions being the same.

| Moisture in slurry | 66.0% | 74.0% |
|---|---|---|
| Retained on 1" | 5.8 | 0 |
| Retained on ¾" | 21.7 | 5.7 |
| Retained on ⅜" | 64.1 | 42.6 |
| Retained on #1 | 86.2 | 81.0 |
| Retained on #8 | 96.5 | 94.0 |

When the herein described process is carried out without adding a bloating agent to the slurry, an aggregate is ordinarily obtained having an average loose density of 55 pounds per cubic foot. When 4.5% of pulverized coal is added to the slurry, the average loose density of the pellets formed therefrom is about 38.5 pounds per cubic foot.

The invention has a number of other advantages. It operates in a continuous manner and the clay introduced into one end of the kiln emerges from the other end in the form of the completed aggregates ready for use as soon as they are sufficiently cooled. The clay is made ready for introduction into the kiln merely by mixing the same with water to form a slurry and thus no preliminary drying is required. No formation of the clay into a plastic mass for extrusion is required. The process may be operated in equipment already existing at ordinary wet process cement plants.

The aggregates as obtained from the kiln have the advantage that they are rounded, have small water absorption and have an unfused rough textured surface well adapted for the production of light weight but strong cement. The aggregates are obtainable in various size gradations without reliance upon crushing thereby avoiding the irregular shapes and waste of excessively small particles usually following from such treatment. Finally, the light weight aggregate may be most easily made by the manufacturers of cement, which companies are in an excellent position for marketing aggregate along with cement.

It should be understood that the present invention is not limited to the specific details herein given but that it extends to all equivalents which will occur to those skilled in the art upon consideration of the claims appended hereto.

I claim:

1. In the manufacture of light weight rounded aggregate composed of an artificially expanded clay interior covered by a fused substantially water impermeable layer coated with an unfused rough textured layer, the improvement which comprises forming the clay into pellets of heterogeneous size, coating and bloating the pellets all as a continuous operation in an inclined rotary kiln into which the clay is introduced in the form of an aqueous slurry into the upper end thereof and a non-fusing coating is introduced at an intermediate point where the clay is in the form of damp lumps.

2. In the manufacture of very light weight rounded aggregate composed of an artificially expanded clay interior covered by a fused substantially water impermeable layer coated with an unfused rough textured layer, the improvement which comprises forming the clay in admixture with an added bloating agent into pellets of heterogeneous size, coating and bloating the pellets all as a continuous operation in an inclined rotary kiln into which the clay and the bloating agent are introduced in the form of an aqueous slurry into the upper end thereof and a non-fusing coating is introduced at an intermediate point where the clay is in the form of damp lumps.

3. A process for producing light weight aggregates of a plurality of sizes which comprises, introducing a slurry of clay into the upper end of an inclined rotary kiln and during its passage therethrough gradually increasing its temperature and driving off water by means of heat from a flame in the lower end of the kiln until the clay particles cohere and form lumps, whereupon the rotation forms the moist clay into pellets of various sizes, then coating the moist pellets in the kiln by means of a finely divided material of higher refractory properties than the clay and thereafter further heating the coated pellets in the kiln to a temperature which softens and fuses the outer surface of the clay pellets but does not cause fusion of the applied coating and which causes generation of gases in the interior of the pellets and effects swelling of the pellets, and finally cooling the bloated pellets, thereby forming light weight aggregate.

4. A process for producing light weight aggregates of a plurality of sizes which comprises, introducing a slurry of clay containing an addition of a bloating agent into the upper end of an inclined rotary kiln and during its passage therethrough gradually increasing its temperature and driving off water by means of heat from a flame in the lower end of the kiln until the clay particles cohere and form lumps, whereupon the rotation forms the moist clay into pellets of various sizes, then coating the moist pellets in the kiln by means of a finely divided material of higher refractory properties than the clay and thereafter further heating the coated pellets in the kiln to a temperature which causes softening and fusion of the outer surface of the clay pellets but does not cause fusion of the applied coating and which causes generation of gases in the interior of the pellets by decomposition of the bloating agent thereby effecting swelling of the pellets, and finally cooling the bloated pellets, whereby light weight aggregate is obtained.

5. A process for producing light weight aggregates of a plurality of sizes which comprises, introducing a slurry of clay containing from 1 to 10% (in relation to the clay) of finely divided coal into the upper end of an inclined rotary kiln and during its passage therethrough gradually increasing its temperature and driving off water by means of heat from a flame in the lower end of the kiln until the clay particles cohere and form lumps, whereupon the rotation forms the moist clay into pellets of various sizes, then coating the moist pellets in the kiln by means of a finely divided material of higher refractory properties than the clay and thereafter further heating the coated pellets in the kiln to a temperature which softens and fuses the outer surface of the clay pellets but does not cause fusion of the applied coating and which causes generation of gases in the interior of the pellets by burning of the coal thereby effecting swelling of the pellets, and finally cooling the bloated pellets, whereby very light weight aggregate is obtained.

6. A process for producing light weight aggregates of a plurality of sizes which comprises, introducing a slurry of clay containing from 1 to 10% (in relation to the clay) of wood sawdust into the upper end of an inclined rotary kiln and during its passage therethrough gradually increasing its temperature and driving off water by means of heat from a flame in the lower end of the kiln until the clay particles cohere and form lumps, whereupon the rotation forms the moist clay into pellets of various sizes, then coating the moist pellets in the kiln by means of a finely divided material of higher refractory properties than the clay and thereafter further heating the coated pellets in the kiln to a temperature which softens and fuses the outer surface of the clay pellets but does not cause fusion of the applied coating and which causes generation of gases in the interior of the pellets by burning of the sawdust, thereby effecting swelling of the pellets, and finally cooling the bloated pellets, whereby light weight aggregate is obtained.

7. A continuous process for producing light weight aggregate comprising mixing clay in the condition it is obtained from the pit with water to produce a flowable slurry, introducing said slurry into the end of an inclined rotary kiln heated by a flame derived by the introduction of fuel and air at the other end, and during continuous passage of the clay through the kiln driving off water until the clay particles cohere, forming lumps of the clay of various sizes, rolling the lumps until they become rounded, introducing into the kiln a material of higher refractoriness than the clay while said lumps are still damp, coating the lumps with said introduced material while the lumps are still damp, heating the coated rounded lumps obtained to a temperature which softens and fuses the surfaces of the clay but not the coating and which causes the lumps to swell, and finally cooling the bloated rounded lumps obtained.

FREDERICK W. KELLEY, Jr.

REFERENCES CITED

The following references are of record in the file of this patent:

UNITED STATES PATENTS

| Number | Name | Date |
| --- | --- | --- |
| 1,583,521 | Boynton | May 4, 1926 |
| 1,774,649 | Hepburn et al. | Sept. 2, 1930 |
| 1,805,020 | Smith | May 12, 1931 |
| 2,015,381 | Harding | Sept. 24, 1935 |
| 2,035,845 | Stanton | Mar. 31, 1936 |
| 2,046,071 | Harding | June 30, 1936 |